United States Patent
Grob et al.

(10) Patent No.: US 7,181,666 B2
(45) Date of Patent: Feb. 20, 2007

(54) METHOD, APPARATUS, AND SYSTEM FOR USER-MULTIPLEXING IN MULTIPLE ACCESS SYSTEMS WITH RETRANSMISSION

(75) Inventors: Matt Grob, La Jolla, CA (US); Avneesh Agrawal, San Diego, CA (US); Arak Sutivong, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 482 days.

(21) Appl. No.: 10/426,546

(22) Filed: Apr. 29, 2003

(65) Prior Publication Data

US 2004/0221218 A1 Nov. 4, 2004

(51) Int. Cl.
G08C 25/02 (2006.01)
G08C 25/04 (2006.01)

(52) U.S. Cl. ........................ 714/748; 714/712; 370/241

(58) Field of Classification Search ................ 714/748, 714/746, 799, 712; 370/241
See application file for complete search history.

(56) References Cited

U.S. PATENT DOCUMENTS

| | | | | |
|---|---|---|---|---|
| 5,416,780 A | * | 5/1995 | Patel | ........................ 370/347 |
| 6,005,852 A | * | 12/1999 | Kokko et al. | ................ 370/329 |
| 6,021,124 A | * | 2/2000 | Haartsen | ...................... 370/336 |
| 6,052,377 A | * | 4/2000 | Ohmi et al. | ................. 370/437 |
| 6,333,937 B1 | * | 12/2001 | Ryan | ........................... 370/468 |
| 6,466,591 B1 | * | 10/2002 | See et al. | ................... 370/535 |
| 6,741,634 B1 | * | 5/2004 | Kim et al. | ................... 375/144 |

* cited by examiner

Primary Examiner—Albert Decady
Assistant Examiner—Dipakkumar Gandhi
(74) Attorney, Agent, or Firm—Thomas R. Rouse; Sandip (Micky) S. Minhas; Dmitry R. Milikovsky

(57) ABSTRACT

According to one aspect of the invention, a method is provided in which a group of users in a system that employs a retransmission mechanism such as Automatic Repeat Request (ARQ) is divided into multiple sub-groups of users. Each user is assigned a number of channels for transmission of information. The number of channels assigned to each user is determined based, at least in part, on the number of the sub-groups and a number of channels available in the system. Transmission intervals are alternated among the multiple sub-groups such that only one of the sub-groups of users is allowed to transmit information during any transmission interval. An idle interval during which a particular user in the first group does not transmit information is used as a waiting period for acknowledgement of a previous transmission by the particular user.

37 Claims, 7 Drawing Sheets

METHOD, APPARATUS, AND SYSTEM FOR USER-MULTIPLEXING IN MULTIPLE ACCESS SYSTEMS WITH RETRANSMISSION

BACKGROUND

1. Field

The present invention relates generally to the field of communications, and more particularly to a method, apparatus, and system for efficient user-multiplexing in multiple access communication systems.

2. Background

Figure 1:
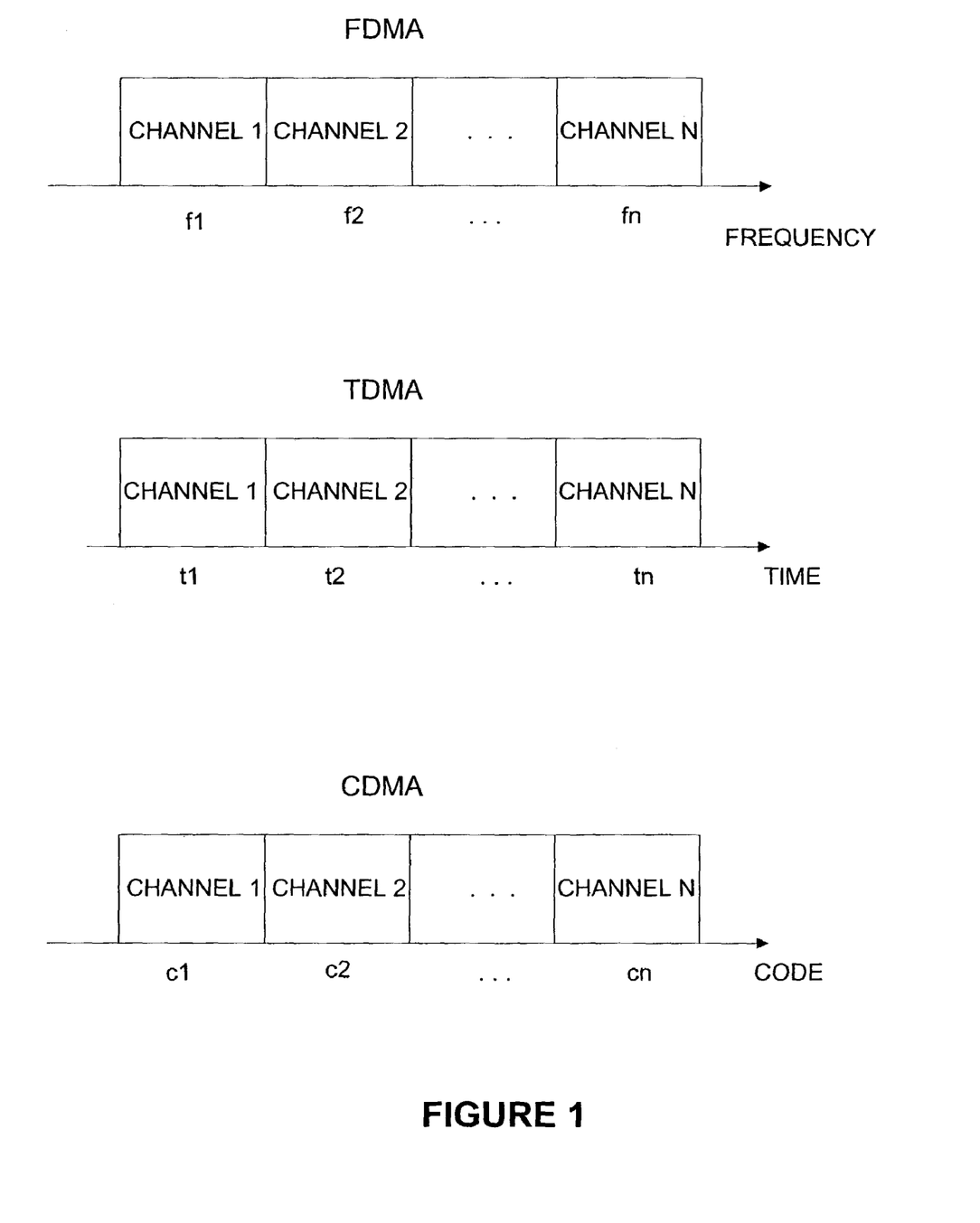
FIG. 1 is a diagram illustrating various channelization schemes in various multiple access systems.

In recent years, communication systems' performance and capabilities have continued to improve rapidly in light of several technological advances and improvements with respect to telecommunication network architecture, signal processing, and protocols. In the area of wireless communications, various multiple access standards and protocols have been developed to increase system capacity and accommodate fast-growing user demand. These various multiple access schemes and standards include Time Division Multiple Access (TDMA), Frequency Division Multiple Access (FDMA), Code Division Multiple Access (CDMA), and Orthogonal Frequency Division Multiple Access (OFDMA), etc. Generally, in a system which employs TDMA technique, each user is allowed to transmit information in his assigned or allocated time slots whereas an FDMA system allows each user to transmit information on a particular frequency that is assigned to that particular user. A CDMA system, in contrast, is a spread spectrum system which allows different users to transmit information at the same frequency and at the same time by assigning a unique code to each user. In an OFDMA system, a high-rate data stream is split or divided into a number of lower rate data streams which are transmitted simultaneously in parallel over a number of subcarriers (also called subcarrier frequencies herein). Each user in an OFDMA system is provided with a subset of the available subcarriers for transmission of information. The subset of carriers provided to each user in an OFDMA system can be fixed or vary, for example, in the case of Frequency-Hopping OFMDA (FH-OFDMA). Multiple access techniques in TDMA, FDMA, and CDMA are illustrated in FIG. 1. As shown in FIG. 1, the communication channels in FDMA are separated by frequencies in which a particular channel corresponds to a particular frequency. In a TDMA system, the communication channels are separated by time in which a particular channel corresponds to a particular time slot. In contrast, communication channels in a CDMA system are separated by codes in which a particular channel corresponds to a particular code.

In wireless systems, it is usually inefficient to guarantee a reliable packet transfer on every single transmission. The inefficiency is particularly pronounced in systems where underlying channel conditions vary drastically from transmission to transmission. For example, in an FH-OFDMA system, there is a wide variation in the received signal-to-noise ratio (SNR) between frames/packets, thus making it difficult and inefficient to guarantee a small frame error rate (FER) for each packet transmission. Such difficulty and inefficiency also apply to other communication systems which employ orthogonal multiple access techniques including, but are not limited to, TDMA, FDMA, and orthogonal CDMA, etc.

In such communication systems, a packet retransmission mechanism such as the Automatic Retransmission/Repeat Request (ARQ) scheme may be used to help lessen such inefficiency. However, this is done at the expense of higher packet latency since it takes longer on average for each packet to get through. In general, large packet latency may not be a significant problem for data traffic but could be detrimental to voice traffic or other types of applications that require low latency in transmission of information. Moreover, packet transmission latency is expected to increase as the number of users in the system continues to grow. Thus, to improve system capacity (e.g., based on system throughput or number of users that simultaneously use the system, etc.), transmission latency should be kept low or small.

Figure 2:
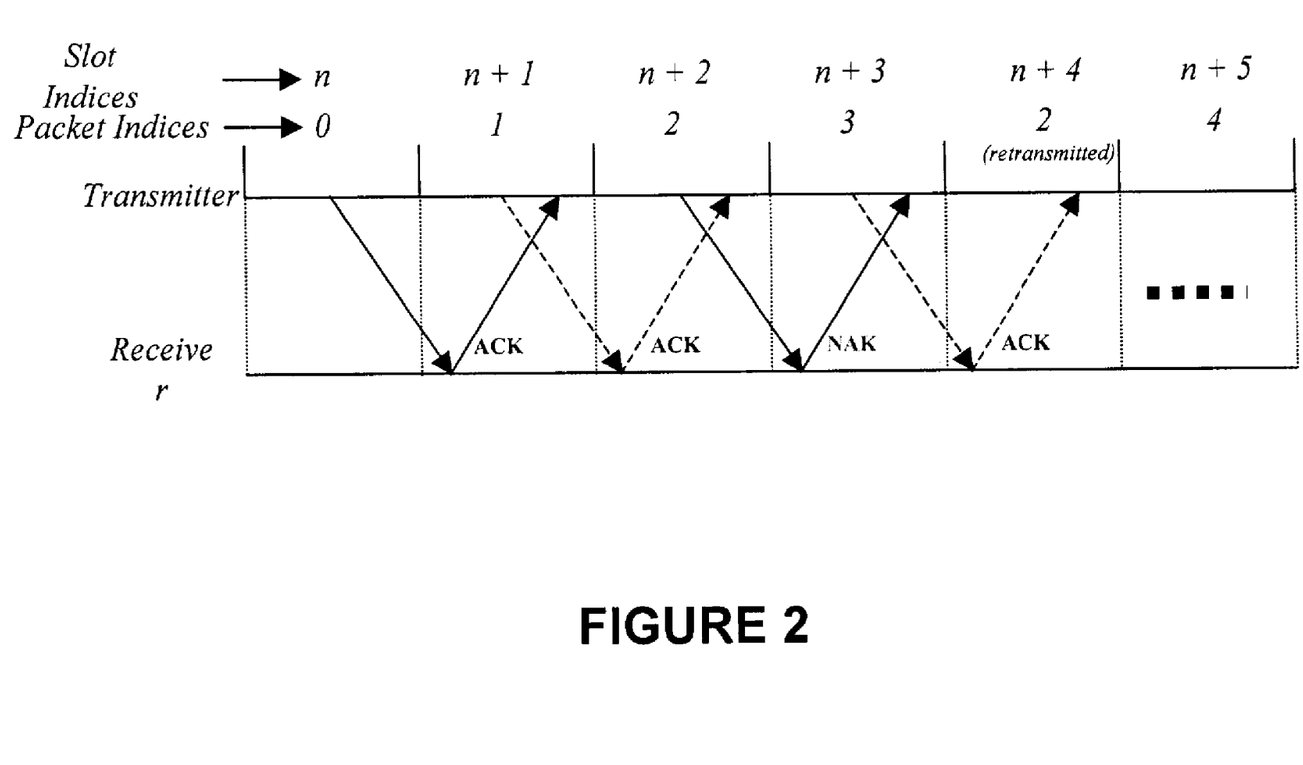
FIG. 2 is a diagram illustrating packet transmissions with two interlacing packet streams in a dual-channel ARQ system.

In systems which employ ARQ scheme, there is a non-negligible additional delay associated with each transmission acknowledgment. In particular, it may take up to several packet transmission times before an acknowledgement (ACK/NAK) of a previously transmitted packet to come back. To improve the link utilization, an S-channel ARQ can be implemented in these systems. The term S-channel ARQ refers to the fact that there are S interlaces (or S interlacing packet streams) from a transmitter to a receiver in these systems. For example, a dual-channel ARQ is often implemented in these systems. As shown in FIG. 2, the term dual-channel refers to the fact that there are two interlacing packet streams from a transmitter to a receiver (denoted by solid lines and dotted lines in FIG. 2). It can be seen that in this type of system configuration, rather than waiting for the acknowledgement (ACK/NAK) to come back prior to sending the next packet, the transmitter continues sending packet whenever available and responds to the acknowledgement when it arrives. While resource utilization (e.g., link utilization) is improved in a dual-channel ARQ system, transmission latency continues to be an issue that needs to be addressed. For example, as illustrated in FIG. 2, when there is a transmission error (e.g., transmission of packet index #2 in slot index n+2), an acknowledgment of such error (e.g., NAK) is received in slot index n+3 and the respective packet is not retransmitted until one slot later (slot index n+4).

Accordingly, there exists a need for a method, apparatus, and system for reducing transmission latency in multiple access systems that employ packet retransmission mechanisms such as ARQ.

SUMMARY

According to one aspect of the invention, in a multiple access communication system employing a retransmission mechanism and having multiple channels available for use by a first group of users for transmission of information, a method is provided in which the first group of users is divided into multiple sub-groups of users. A number of channels to be assigned to each user in each sub-group is determined based, at least in part, on the number of sub-groups and the number of multiple channels available. The number of channels determined is assigned to each user in each sub-group for transmission of information. Transmission intervals are alternated among the multiple sub-groups of users in which only one of the sub-groups of users is allowed to transmit information during any transmission interval, and in which an idle interval during which a particular user in the first group does not transmit information is used as a waiting period for acknowledgement of a previous transmission by the particular user.

According to another aspect of the invention, in a communication system employing an Automatic Repeat Request (ARQ) scheme and having multiple channels available for use by a first group and a second group of users to transmit information, a method is provided in which the first group of users is divided into multiple sub-groups of users. A number of channels to be assigned to each user in each sub-group in the first group is determined based, at least in part, on the number of sub-groups in the first group and a number of channels available for transmission of information by the first group. The number of channels determined is assigned to each user in each sub-group in the first group for transmission of information. Transmission intervals are rotated among the multiple sub-groups of users in the first group, in which only one of the sub-groups of users in the first group is allowed to transmit information during any transmission interval, in which an idle interval during which a particular user in the first group does not transmit information is used as a waiting period for acknowledgement of a previous transmission by the particular user, and in which the second group of users is allowed transmit information concurrently with the first group of users.

According to a further aspect of the invention, a multiple access communication system employing a retransmission protocol for error correction is disclosed which includes multiple communication channels available for transmission of information and a first group of multiple users to share the multiple communication channels for transmission of information. The multiple users in the first group are divided into multiple sub-groups of users. Each user is assigned a distinct subset of the multiple communication channels based, at least in part, on the number of the communication channels available and the number of sub-groups of users. Transmission intervals are rotated among the multiple sub-groups of users in the first group, in which only one of the sub-groups of users in the first group is allowed to transmit information during any transmission interval, and in which an idle interval during which a particular user in the first group does not transmit information is used as a waiting period for acknowledgement of a previous transmission by the particular user.

According to yet another aspect of the invention, in a system employing a retransmission mechanism for error correction, a method is provided in which a total number of communication channels available in a multiple access system and a total number of users in a first group of users currently being served by the system are determined periodically. The first group of users is partitioned into multiple sub-groups of users based on the total number of users in the group. A distinct subset of the communication channels available is assigned to each user in each sub-group based, at least in part, on the total number of communication channels available and the number of sub-groups in the first group. Transmission intervals are alternately allocated to the multiple sub-groups in the first group, in which only one of the sub-groups of users in the first group is allowed to transmit information during any transmission interval, and in which an idle interval during which a particular user in the first group does not transmit information is used as a waiting period for acknowledgement of a previous transmission by the particular user.

According to a further aspect of the invention, a machine-readable medium is provided containing instructions which, when executed by a machine, cause the machine to perform operations to determine a number of channels available for transmission of information and a number of users in a first group of users in a multiple access communication system which employs a retransmission mechanism, divide the first group of users into multiple sub-groups of users, determine a number of channels to be assigned to each user in each sub-group, based, at least in part, on the number of sub-groups and the number of channels available, assign the number of channels determined to each user in each sub-group for transmission of information, and alternate transmission intervals among the multiple sub-groups of users, in which only one of the sub-groups of users is allowed to transmit information during any transmission interval, and in which an idle interval during which a particular user in the first group does not transmit information is used as a waiting period for acknowledgement of a previous transmission by the particular user.

BRIEF DESCRIPTION OF THE DRAWINGS

Various aspects and features of the present invention are disclosed by the following detailed description and references to the accompanying drawings, in which.

DETAILED DESCRIPTION

In the following detailed description numerous specific details are set forth. However, it is understood that various embodiments of the invention may be practiced without these specific details. It should be appreciated and understood by one skilled in the art that the various embodiments of the invention described below are exemplary and are intended to be illustrative of the invention rather than limiting.

As described herein, according to one embodiment of the invention, a method is provided to allow efficient user-multiplexing in a multiple access system which employs a retransmission mechanism such as the Automatic Repeat/Retransmission (ARQ) scheme. In the examples that are provided below, while dual-channel ARQ systems with two interlaces are discussed for the purposes of explanation and illustration, it should be understood and appreciated by one skilled in the art that the teachings of the present invention are not limited to multiple access system with two interlaces but are also equally applicable to other multiple systems which employ different numbers of interlaces.

As described in more details below, in one embodiment of the invention, a method for efficient user-multiplexing in a multiple access system that has a set of channels available for transmission of information is disclosed in which a group of users being served by the system is divided into multiple sub-groups. In one embodiment, the number of sub-groups is determined based on the number of interlaces or interlacing packet streams in the system. For example, if the system employs an S-channel ARQ mechanism (e.g., S interlaces), then the number of sub-groups will correspond to the number of interlaces (e.g., number of sub-groups=number of interlaces=S). A distinct subset of the available channels is assigned to each user in each sub-group to be used by each respective user for transmission of information based, at least in part, on the number of channels available and the number of the sub-groups of users. Transmission intervals are rotated or alternated among the multiple sub-groups in which only users in one of the multiple sub-groups are allowed to transmit information over corresponding assigned channels during any transmission interval. The methods and techniques for user-multiplexing described herein are applicable to various multiple access systems that employ orthogonal multiple access and channelization techniques that include, but are not limited to, TDMA, FDMA, CDMA, and OFDMA, etc.

Figure 3:
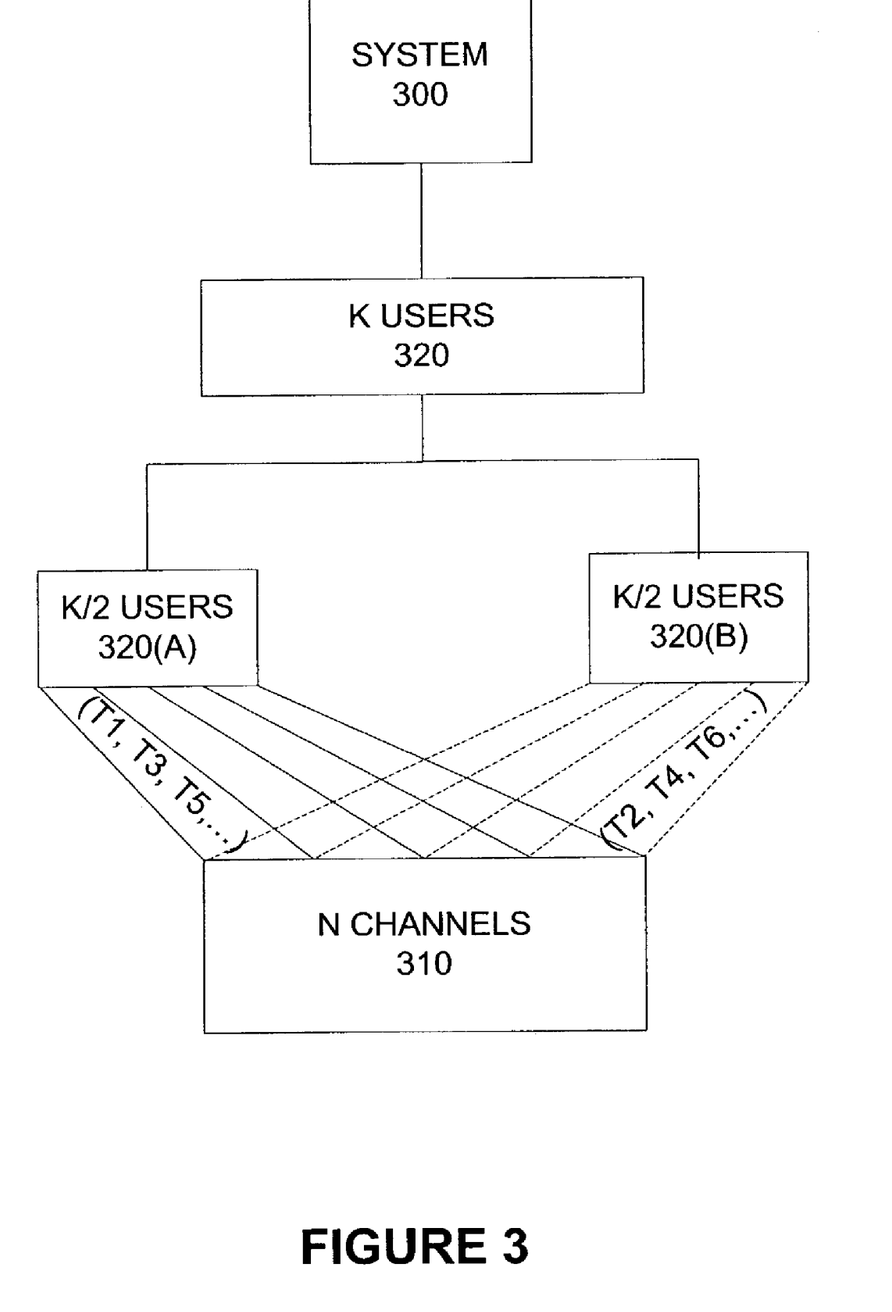
FIG. 3 is a diagram illustrating a multiple access system according to one embodiment of the invention.

FIG. 3 is a diagram illustrating an exemplary multiple access system 300 in accordance with one embodiment of the invention. As shown in FIG. 3, the multiple access system 300 has a set of N channels 310 available for transmission of information by a group of K users 320. In one embodiment, the group of K users represents the number of users that are currently served or supported by the system and the set of N channels represent the number of available orthogonal channels that are used for transmission of information. Depending upon the multiple access and channelization techniques employed by the multiple access system 300, the channels 310 and users 320 can be separated or differentiated by time (e.g., in TDMA scheme), frequency (e.g., in FDMA and OFDMA schemes), or code (e.g., in orthogonal CDMA scheme). Conventionally, in prior-art multiple access systems, each user is assigned a fixed number of channels (e.g., N/K non-overlapping channels). All users can then simultaneously transmit information using their respective N/K channels.

In contrast, as shown in FIG. 3, a novel and efficient user-multiplexing technique is illustrated in which the group of K users 320 is divided into multiple sub-groups. In this example, for the purposes of illustration and explanation, it is assumed that the system employs a dual-channel ARQ mechanism and the group of K users 320 is therefore divided into two sub-groups, namely a first sub-group 320(A) and a second sub-group 320(B). It should be understood and appreciated by one skilled in the art, however, that the teachings of the present invention are equally applicable to other system configurations and applications in which different numbers of subgroups are used (e.g., S sub-groups for systems having S interlaces).

Continuing with the present discussion, in one embodiment, each user-is assigned a number of non-overlapping channels based, at least in part, on the total number of channels available for transmission of information and the number of sub-groups of users. In one embodiment, each user is assigned M channels to be used for transmission of information, based on the following formula:

$$M=N/(K/S)$$

where M corresponds to the number of channels assigned to each user; N corresponds to the total number of channels available for transmission; K corresponds to the total number of users; and S corresponds to the number of sub-groups.

Assuming that the group of K users is divided into two sub-groups 320(A) and 320(B) as shown in FIG. 3, then each user will be assigned M channels=N/(K/S)=N/(K/2)=2N/K channels. For example, if N=8, K=8, and S=2, then each user will be assigned 2N/K=2×8/8=2 channels.

Users in the same sub-group will have non-overlapping (i.e., distinct) channel assignment. However, channels may be reused between different sub-groups. For example, assuming that the first sub-group contains four users U1, U2, U3, and U4, the second sub-group also contains four users U5, U6, U7, and U8, and there are 8 channels n1, n2, ..., n8, then channel assignment for each user C(Ui) may be as follows:

C(U1)={n1, n2}

C(U2)={n3, n4}

C(U3)={n5, n6}

C(U4)={n7, n8}

C(U5)={n1, n4}

C(U6)={n2, n8}

C(U7)={n3, n5}

C(U8)={n6, n7}

In one embodiment, the multiple sub-groups of users alternate the transmission intervals. In other words, only K/S users are allowed to transmit information on their assigned channels at any given time. Again, assuming that there are two sub-groups A and B in this example, then the two sub-groups A and B will alternate the transmission intervals. Thus, only users in sub-group A or users in sub-group B are allowed to transmit information during any transmission interval. In this example, the implication here is that each user now needs to send the same amount of information in a shorter duration of time (e.g., half the time when there are two sub-groups). However, this is possible and straightforward since each user is now assigned more channels (e.g., twice the number of channels that the respective user would have been assigned in a conventional system) for transmission of information during the transmission intervals (also called time slots) assigned to the respective user. In one embodiment, if certain users do not have enough link budgets to close the communication link, those users may not be included in the user-multiplexing scheme described herein.

Referring again to FIG. 3, the two sub-groups of users A and B will alternate transmission intervals. For example, users in sub-group A will transmit information in time slots T1, T3, T5, and so on whereas users in sub-group B will transmit information in time slots T2, T4, T6, and so on. Thus, during any given time slot or transmission interval, there are less users (e.g., half of the users) allowed to transmit information. However, each user has more channels (e.g., twice the number of channels) to transmit information. It should be noted that, in the example discussed above, it is assumed that K is an even number. In the case where N is an odd number, (K+1)/2 users can be assigned to sub-group A and the remaining (K+1)/2 users can be assigned to sub-group B. Each user can then be assigned 2N/(K+1) channels. Similar modifications or variations can be used in other instances, for example, when N is not divisible by K. It should be understood and appreciated by one skilled in the art that the concepts and methods described herein and variations thereof can be employed in various applications and system environments, within the scope of the present invention.

Figure 4:
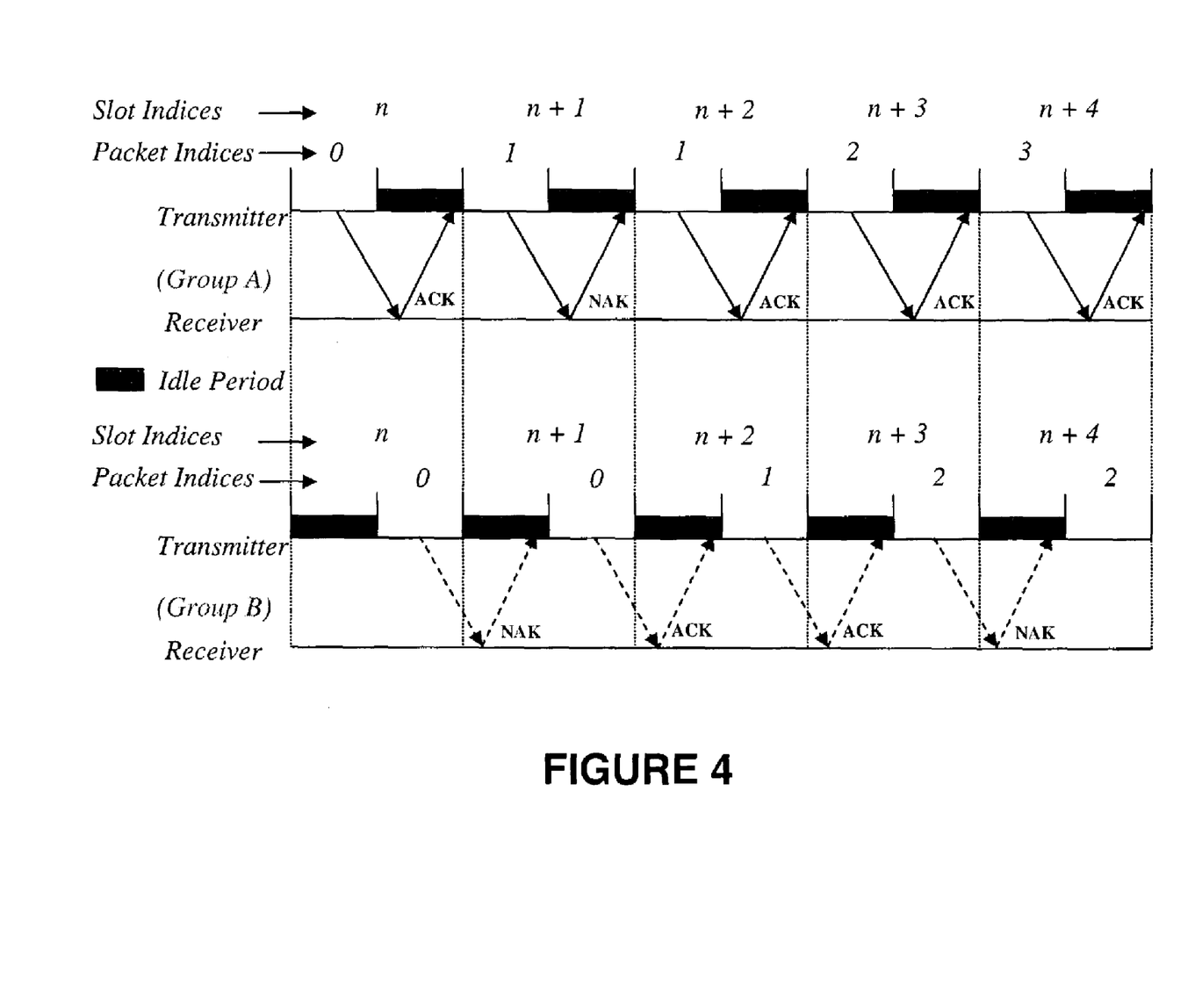
FIG. 4 is a diagram illustrating packet transmissions in a multiple access system in accordance with one embodiment of the invention.

FIG. 4 is a diagram illustrating packet transmissions in a multiple access system in accordance with one embodiment of the invention. Again, for purposes of illustration and explanation, it is assumed that the system in this example employs a dual-channel ARQ and the group of K users as described above is divided into two sub-groups of users A and B. In this example, only one of the two sub-groups is allowed to transmit information during any transmission interval. In other words, the two sub-groups of users A and B are time-multiplexed. As shown in FIG. 4, users in sub-group A are allowed to transmit information over their assigned channels in the first half (or first period) of each time slot n, n+1, n+2, etc. whereas users in sub-group B are allowed to transmit information over their assigned channels in the second half (or second period) of each time slot n, n+1, n+2, etc. It can be seen that a user (e.g., a transmitter) in sub-group A transmits information in the first half of each time slot whereas a user (e.g., a transmitter) in sub-group B transmits information in the second half of each time slot.

In the system configuration as described above in FIGS. 3 and 4, it should be noted that each user's idle period provides certain improvements compared with a conventional system. For example, users in idle periods do not consume system resources, thus allowing active users (e.g., users who are transmitting information) more access to and more usage of the limited system resources. In addition, as illustrated in FIG. 4, the idle period can be used as a waiting period for the response/acknowledgement (ACK or NAK) signal to comeback from the receiver. Based on the acknowledgement received, the user (e.g., the transmitter) can decide whether to retransmit the previously sent data (e.g., packet) or transmit new data (e.g., a new packet) in the upcoming active interval (e.g., the next interval allocated to the user). Accordingly, the new methods as described herein in accordance with various embodiments of the invention may provide significant improvements in terms of latency statistics compared to conventional or existing systems.

From the description provided above, it can be seen that, in terms of resource utilization, a proposed system which employs the teachings of the present invention can achieve the same or comparable efficiency on average compared to that of a convention dual-channel ARQ system. However, in terms of packet latency (e.g., queuing delay+retransmission delay), the proposed system is superior. For example, when there is a packet transmission error, the respective packet will not be retransmitted until one slot later (i.e., an additional delay of 1 slot) in a conventional system employing a dual-channel ARQ. In contrast, in a system employing the teachings of the present invention, the packet can be retransmitted on the subsequent time slot (i.e., with no additional delay). Accordingly, the overall packet latency can be reduced in the proposed system.

Figure 5:
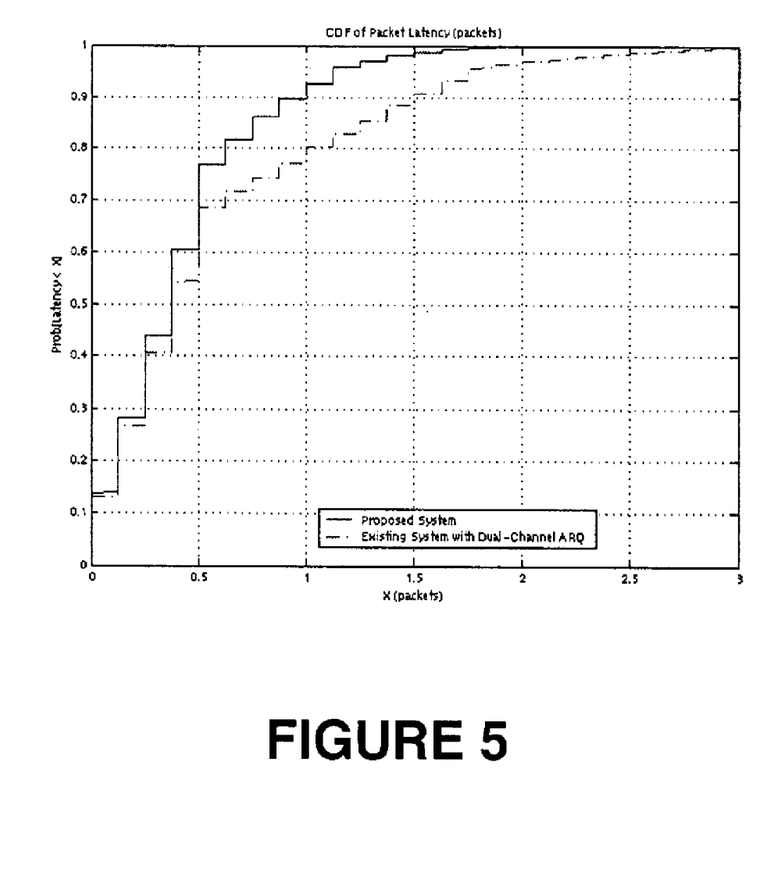
FIG. 5 shows a diagram of a simulation example comparing the latency statistics between a conventional system and a proposed system in accordance with one embodiment of the invention.

FIG. 5 shows a diagram of an exemplary simulation comparing the latency statistics between a conventional system and a proposed system in accordance with one embodiment of the invention. In this example, the unit of latency is packets. Alternatively, time slots can also be used as unit of latency for comparison purposes. As illustrated in FIG. 5, the latency statistics of the two systems are shown using CDFs (cumulative density functions). It should be noted that the jagged (or staircase-like) appearance of the CDFs is from the fact that only a finite number of different delays are possible for a particular set of system parameters. Accordingly, such an appearance of the CDFs shown in FIG. 5 is not a simulation artifact. It can be seen from FIG. 5 that the latency statistics of the proposed system is consistently better compared to that of the conventional system employing a dual-channel ARQ scheme. For instance, considering a 1-packet latency point, in the proposed system, about 90% of the packets have a latency smaller than 1 packet. In contrast, in the conventional system which employs a dual-channel ARQ, only about 80% of the packets have a latency that is smaller than 1 packet. As mentioned above, for certain types of traffic and applications (e.g., voice traffic), smaller or lower packet latency can translate directly into a higher system capacity (e.g., system voice capacity).

Figure 6:
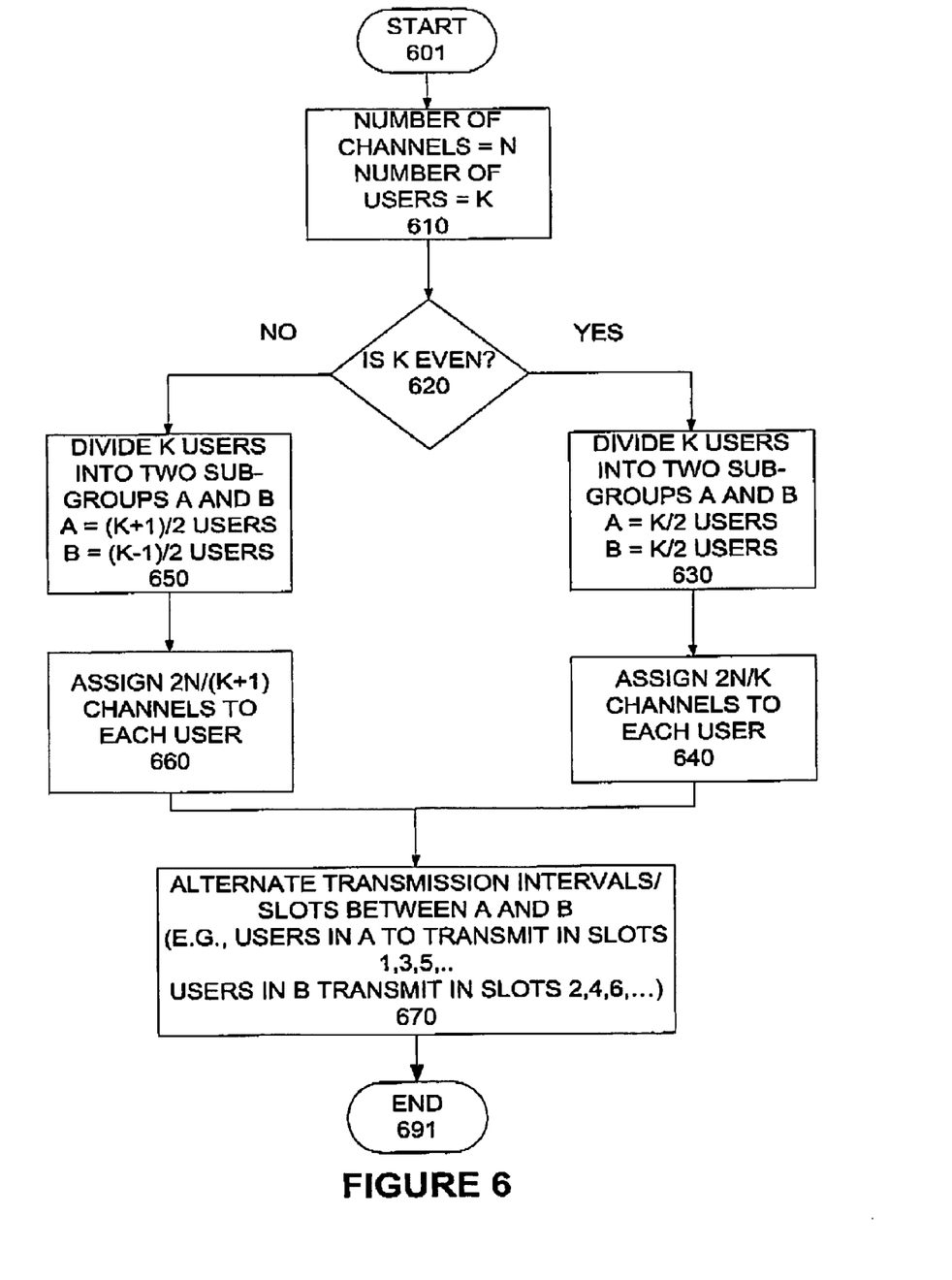
FIG. 6 is a flow diagram illustrating a method in accordance with one embodiment of the invention.

FIG. 6 shows a diagram of a method for channel assignment in a multiple access system, according to one embodiment of the invention. The system in this example has N orthogonal channels available for transmission and a group of K users, as shown at block 610. In this example, it is assumed that the system employs a dual-channel ARQ. At block 620, if K is even, the method proceeds to block 630, otherwise the method proceeds to block 650. At block 630, the group of K users is equally divided into two sub-groups of users A and B with each sub-group having K/2 users. At block 640, each user is assigned N/(K/2)=2N/K channels. At block 650, when K is odd, the group of K users is divided into two sub-groups A and B with A having (K+1)/2 users and B having (K−1)/2 users. In this case, each user is then assigned 2N/(K+1) channels, at block 660. The method then proceeds from either block 640 or block 660 to block 670. At block 670, the transmission intervals are alternately allocated to subgroups A and B. In other words, only one sub-group is allowed to transmit information at any given time. For example, users in sub-group A will transmit in slots 1, 3, 5, . . . , and so one while users in sub-group B will transmit in slots 2, 4, 6, . . . , and so on.

Figure 7:
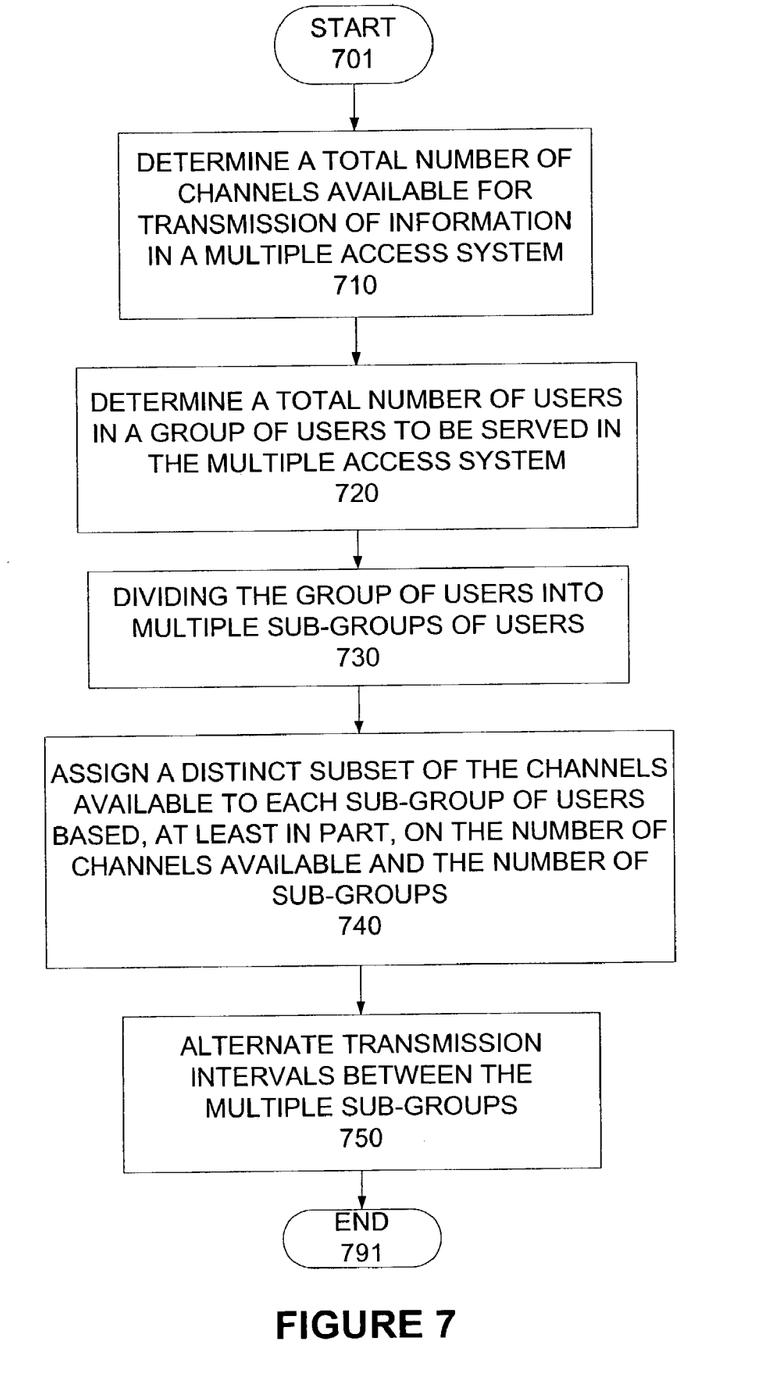
FIG. 7 shows a flow diagram of a method in accordance with one embodiment of the invention.

FIG. 7 illustrates a flow diagram of a method in accordance with one embodiment of the invention. At block 710, a number of channels (e.g., orthogonal channels) available for transmission of information in a multiple access system is determined. At block 720, a number of users in a group of users in the system is determined. In one embodiment, the determination of the number of channels available and the number of users in the system can be done periodically. In another embodiment, such determination can be done at predetermined times, depending on the particular system configuration and environment. At block 730, the group of users is divided into multiple sub-groups of users. In one embodiment, as described above, the number of sub-groups of users is determined based on the number of interlaces (also called interlacing packet streams in the system). Accordingly, if the system employs an S-channel ARQ scheme (S interlaces), the number of sub-groups may be chosen to correspond to the number of interlaces (e.g., number of sub-groups=number of interlaces=S). For example, assuming that the system employs a dual-channel ARQ scheme (two interlaces); the group of users can be divided into two sub-groups of users each containing approximately an equal number of users. At block 740, each user is assigned a subset of the available channels to be used by each respective user for transmission of information based, at least in part, on the number of channels available and the number of sub-groups. For example, assuming that there are N channels available, K users in the group, and the group of K users is divided into S sub-groups of users, then each user can be assigned M=N/(K/S) channels for transmission of information. At block 750, transmission intervals are alternated between the multiple sub-groups. For example, users in sub-group 1 will transmit information over their assigned channels in time slots or transmission intervals (also called periods) T1, T3, T5, . . . and so on. Likewise, users in sub-group 2 will transmit information over their assigned channels in T2, T4, T6, . . . and so on.

It should be noted that, in various system application and implementations according to the teachings of the present invention, not all users in the system need to be multiplexed in the manner described above. In various system configurations, certain users may not need to be multiplexed at all. In this case, these users will continue to transmit information at all times and do not need to pause. For example, assuming again that a system in accordance with one embodiment of the invention has N channels available and K users, not all users need to be multiplexed. In this scenario, some users (e.g., J users) will not be included in the multiplexing scheme described above. Accordingly, the group of users that need to be multiplexed contains G=K−J users. Assuming that the system employs S-channel ARQ, this group of G users will be divided into a number of sub-groups that corresponds to the number of interlaces (e.g., S sub-groups). In this case, the J users that are not included in the multiplexing scheme are considered a separate sub-group. Accordingly, there are in fact S+1 sub-groups of users in this scenario. A subset of N channels may be assigned to the sub-group of J users. The rest of N channels may be assigned to the S sub-groups of users as described above. The users in the S sub-groups will alternate (or rotate) turns in transmitting information over their assigned channels while the J users can always transmit over their assigned channels. In this example, this sub-group of J users will need to use the S-channel ARQ to improve link utilization with respect to their assigned channels.

The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for transmission of information in a multiple access communication system employing a retransmission mechanism and having multiple channels available for use by a first group of users for transmission of information, the method comprising:
   dividing the first group of users into multiple sub-groups of users;
   determining a number of channels to be assigned to each user in each sub-group based, at least in part, on the number of sub-groups and the number of multiple channels available;
   assigning the number of channels determined to each user in each sub-group for transmission of information; and
   alternating transmission intervals among the multiple sub-groups of users, wherein only one of the sub-groups of users is allowed to transmit information during any transmission interval, and wherein an idle interval during which a particular user in the first group does not transmit information is used as a waiting period for acknowledgement of a previous transmission by the particular user.

2. The method of claim 1 wherein the number of channels assigned to each user in each sub-group is determined according to the following formula:

$$M=N/(K/S)=SN/K$$

where M corresponds to the number of channels assigned to each user in each sub-group; N corresponds to the number of channels available for transmission; K corresponds to the number of users in the first group; and S corresponds to the number of sub-groups.

3. The method of claim 1 wherein the first group of users contains an even number of users and wherein the multiple sub-groups comprise a first sub-group and a second sub-group having an equal number of users.

4. The method of claim 3 wherein the number of channels assigned to each user in each sub-group is determined according to the following formula:

$$M=N/(K/2)=2N/K$$

where M corresponds to the number of channels assigned to each user in each sub-group; N corresponds to the number of channels available for transmission; and K corresponds to the number of users in the first group.

5. The method of claim 1 wherein the first group of users contains an odd number of users and wherein the multiple sub-groups comprise a first sub-group and a second sub-group, the first sub-group having a first number of users, the second sub-group having a second number of users which is one less than the first number of users.

6. The method of claim 5 wherein the number of channels assigned to each user in each sub-group is determined according to the following formula:

$$M=2N/(K+1)$$

where M corresponds to the number of channels assigned to each user in each sub-group; N corresponds to the number of channels available for transmission; and K corresponds to the number of users in the first group.

7. The method of claim 1 wherein users in each sub-group are assigned non-overlapping channels.

8. The method of claim 7 wherein channels are reused among the multiple sub-groups.

9. The method of claim 1 further comprising:
   determining whether to transmit a new packet of information or retransmit a previous packet of information, based on the acknowledgement of the previous transmission.

10. The method of claim 1 wherein the system's channelization is performed based on an orthogonal basis.

11. The method of claim 10 wherein the system's channelization is performed in accordance with a Frequency Division Multiplex (FDM) scheme.

12. The method of claim 10 wherein the system's channelization is performed in accordance with a Code Division Multiplex (CDM) scheme.

13. The method of claim 10 wherein the system's channelization is performed in accordance with an Orthogonal Frequency Division Multiplex (OFDM) scheme.

14. The method of claim 1 wherein the retransmission mechanism employed by the communication system operates in accordance with an Automatic Repeat Request (ARQ) protocol.

15. In a communication system employing an Automatic Repeat Request (ARQ) scheme and having multiple channels available for use by a first group and a second group of users to transmit information, a method comprising:

dividing the first group of users into multiple sub-groups of users;

determining a number of channels to be assigned to each user in each sub-group in the first group based, at least in part, on the number of sub-groups in the first group and a number of channels available for transmission of information byte first group;

assigning the number of channels determined to each user in each sub-group in the first group for transmission of information; and alternating transmission intervals among the multiple sub-groups of users in the first group, wherein only one of the sub-groups of users in the first group is allowed to transmit information during any transmission interval, wherein an idle interval during which a particular user in the first group does not transmit information is used as a waiting period for acknowledgement of a previous transmission by the particular user, and wherein the second group of users is allowed transmit information concurrently with the first group of users.

16. The method of claim 15 wherein the number of channels assigned to each user in each sub-group in the first group is determined according to the following formula:

$$M=N/(K/S)=SN/K$$

where M corresponds to the number of channels assigned to each user in each sub-group; N corresponds to the number of channels available for transmission K corresponds to the number of users in the first group; and S corresponds to the number of sub-groups.

17. The method of claim 15 wherein the first group of users contains an even number of users and wherein the multiple sub-groups comprise a first sub-group and a second sub-group having an equal number of users.

18. The method of claim 17 wherein the number of channels assigned to each user in each sub-group is determined according to the following formula:
$M=N/(K/2)=2N/K$ where M corresponds to the number of channels assigned to each user in each sub-group; N corresponds to the number of channels available for transmission; and K corresponds to the number of users in the first group.

19. The method of claim 15 wherein the first group of users contains an odd number of users and wherein the multiple sub-groups comprise a first sub-group and a second sub-group, the first sub-group having a first number of users, the second sub-group having a second number of users which is one less than the first number of users.

20. The method of claim 19 wherein the number of channels assigned to each user in each sub-group is determined according to the following formula:

$$M=2N/(K+1)$$

where M corresponds to the number of channels assigned to each user in each sub-group; N corresponds to the number of channels available for transmission; and K corresponds to the number of users in the first group.

21. The method of claim 15 further comprising:

determining whether to transmit a new packet of information or retransmit a previous packet of information, based on the acknowledgement of the previous transmission.

22. A multiple access communication system employing a retransmission protocol for error correction, the system comprising:

multiple communication channels available for transmission of information; and a first group of multiple users to share the multiple communication channels for transmission of information, wherein the multiple users in the first group are divided into multiple sub-groups of users, each user is assigned a distinct subset of the multiple communication channels based, at least in part, on the number of the communication channels available and the number of sub-groups of users, wherein transmission intervals are rotated among the multiple sub-groups of users in the first group, wherein only one of the sub-groups of users in the first group is allowed to transmit information during any transmission interval, and wherein an idle interval during which a particular user in the first group does not transmit information is used as a waiting period for acknowledgement of a previous transmission by the particular user.

23. The system of claim 22 wherein the number of channels assigned to each user in each sub-group in the first group is determined according to the following formula:

$$M=N/(K/S)=SN/K$$

where M corresponds to the number of channels assigned to each user in each sub-group; N corresponds to the number of channels available for transmission; K corresponds to the number of users in the first group; and S corresponds to the number of sub-groups.

24. The system of claim 22 wherein the first group of users contains an even number of users and wherein the multiple sub-groups comprise a first sub-group and a second sub-group having an equal number of users.

25. The system of claim 24 wherein the number of channels assigned to each user in each sub-group is determined according to the following formula:

$$M=N/(K/2)=2N/K$$

where M corresponds to the number of channels assigned to each user in each sub-group; N corresponds to the number of channels available for transmission; and K corresponds to the number of users in the first group.

26. The system of claim 22 wherein the first group of users contains an odd number of users and wherein the multiple sub-groups comprise a first sub-group and a second sub-group, the first sub-group having a first number of users, the second sub-group having a second number of users which is one less than the first number of users.

27. The system of claim 26 wherein the number of channels assigned to each user in each sub-group is determined according to the following formula:

$$M=2N/(K+1)$$

where M corresponds to the number of channels assigned to each user in each sub-group; N corresponds to the number of channels available for transmission; and K corresponds to the number of users in the first group.

28. The system of claim 22 wherein the particular user determines whether to transmit a new packet of information or retransmit a previous packet of information, based on the acknowledgement of the previous transmission.

29. The system of claim 22 wherein the system's channelization is performed based on an orthogonal basis.

30. The system of claim 29 wherein the system's channelization is performed in accordance with a Frequency Division Multiplex (FDM) scheme.

31. The system of claim 29 wherein the system's channelization is performed in accordance with a Code Division Multiplex (CDM) scheme.

32. The system of claim 29 wherein the system's channelization is performed in accordance with an Orthogonal Frequency Division Multiplex (OFDM) scheme.

33. A method comprising:
  determining periodically a total number of communication channels available in a multiple access system and a total number of users in a first group of users currently being served by the system, the system employing a retransmission mechanism for error correction;
  partitioning the first group of users into multiple sub-groups of users based on the total number of users in the group;
  assigning a distinct subset of the communication channels available to each user in each sub-group based, at least in part, on the total number of communication channels available and the number of sub-groups in the first group; and
  alternately allocating transmission intervals to the multiple sub-groups in the first group, wherein only one of the sub-groups of users in the first group is allowed to transmit information during any transmission interval, and wherein an idle interval during which a particular user in the first group does not transmit information is used as a waiting period for acknowledgement of a previous transmission by the particular user.

34. The method of claim 33 further comprising:
  determining whether to transmit a new packet of information or retransmit a previous packet of information, based on the acknowledgement of the previous transmission.

35. A machine-readable medium comprising instructions which, when executed by a machine, cause the machine to perform operations including:
  determining a number of channels available for transmission of information and a number of users in a first group of users in a multiple access communication system which employs a retransmission mechanism;
  dividing the first group of users into multiple sub-groups of users;
  determining a number of channels to be assigned to each user in each sub-group, based, at least in part, on the number of sub-groups and the number of channels available;
  assigning the number of channels determined to each user in each sub-group for transmission of information; and
  alternating transmission intervals among the multiple sub-groups of users, wherein only one of the sub-groups of users is allowed to transmit information during any transmission interval, and wherein an idle interval during which a particular user in the first group does not transmit information is used as a waiting period for acknowledgement of a previous transmission by the particular user.

36. The machine-readable medium of claim 35 wherein the number of channels assigned to each user in each sub-group is determined according to the following formula:

$$M = N/(K/S) = SN/K$$

where M corresponds to the number of channels assigned to each user in each sub-group; N corresponds to the number of channels available for transmission; K corresponds to the number of users in the first group; and S corresponds tote number of sub-groups.

37. The machine-readable medium of claim 35 wherein the operations preformed further comprising:
  determining whether to transmit a new packet of information or retransmit a previous packet of information, based on the acknowledgement of the previous transmission.

* * * * *